United States Patent [19]
Vogt

[11] Patent Number: 5,816,032
[45] Date of Patent: *Oct. 6, 1998

[54] PROTECTIVE SUPPORT WRAP FOR A HORSE LEG

[75] Inventor: Les Vogt, Santa Maria, Calif.

[73] Assignee: Farnam Companies, Inc., Phoenix, Ariz.

[ * ] Notice: The term of this patent shall not extend beyond the expiration date of Pat. No. 5,579,627.

[21] Appl. No.: 699,438

[22] Filed: Aug. 19, 1996

Related U.S. Application Data

[63] Continuation-in-part of Ser. No. 386,470, Feb. 10, 1995, Pat. No. 5,579,627.

[51] Int. Cl.⁶ .............................. B68C 5/00; A01K 13/00
[52] U.S. Cl. .................................................................. 54/82
[58] Field of Search ................................... 54/82; 119/850

[56] References Cited

U.S. PATENT DOCUMENTS

| | | | |
|---|---|---|---|
| 3,209,517 | 10/1965 | Hyman | 119/850 X |
| 3,405,506 | 10/1968 | Kostur | 54/82 |
| 5,115,627 | 5/1992 | Scott | 54/82 |
| 5,579,627 | 12/1996 | Vogt | 54/82 |

*Primary Examiner*—Robert P. Swiatek
*Attorney, Agent, or Firm*—Harrison & Egbert

[57] ABSTRACT

A protective support wrap for a lower leg of a horse including a panel having an inner surface and an outer surface and a length dimension suitable for wrapping around the lower leg of the horse, a tendon support roll affixed to the panel and having a surface protruding outwardly of the inner surface of the panel so as to press against the tendon of the lower leg, and a fastener affixed to the panel and extending outwardly therefrom for affixing to the outer surface of the panel when the panel is wrapped around the lower leg. The tendon support roll includes a first tendon support roll affixed to the panel and extending transverse to the length dimension of the panel and a second tendon support roll affixed to the panel in spaced parallel relationship to the first tendon support roll. Each of the first and second tendon support rolls has an upper end tapered so as to thicken in a direction toward a lower end. The lower end of each of the first and second tendon support rolls is tapered so as to thicken in a direction toward the upper end. Each of the upper and lower ends of the first and second tendon support rolls has curved edges.

17 Claims, 2 Drawing Sheets

PROTECTIVE SUPPORT WRAP FOR A HORSE LEG

RELATED APPLICATIONS

The present application is a continuation-in-part of U.S. patent application Ser. No. 08/386,470, filed on Feb. 10, 1995, and entitled "PROTECTIVE SUPPORT WRAP FOR A HORSE LEG". This application issued as U.S. Pat. No. 5,579,627 on Dec. 3, 1996.

TECHNICAL FIELD

The present invention relates to in general to an athletic leg support for a horse and more specifically involves a wrap for a horse's lower leg with improved protection, support and shock dissipation characteristics.

BACKGROUND ART

Horses are highly susceptible to injury to the lower leg. Some injury results from external blows, such as by kicking. Athletic horses, particularly young race horses, often suffer injury to the tendon, fetlock, lower sesmoid bones, and suspensory ligament from the repeated hoof shock during running.

One particular problem is that the fetlock tends to drop as the lower suspensory ligaments fatigue, such as during a long ride such as a polo match or the like. This dropping of the fetlock exposes the sesmoid bones and suspensory ligaments in this crucial area to damage.

Another problem is the formation or wind puffs in the lower leg. Wind puffs are collections of fluid that can often be seen as bulges under the skin. Wind puffs interfere with healthy leg function and detract from performance.

To help alleviate these problems, conventionally, an athletic wrap or boot is placed on the distal limb of athletic horses to provide protection from trauma. The boot acts as a shield to prevent kicking and injury from interfering blows by the horse's other hoofs or legs. Additionally, the boot may provide significant energy absorption as the fetlock is extended. The more energy the boot absorbs, the less impact energy is available for tissue deformation and injury.

Conventional boots comprise a band of elastic material that is wrapped around the lower leg. There are a number of disadvantages to the band wrap boot. The efficacy of such wraps are very operator dependent in that if the wrap is too tight or too loose the wrap is ineffectual or may even cause more problems or damage. Such wraps do not dissipate energy sufficiently so as to act as a shock deadener. Such wraps pull the tendon toward the bone and into an unnatural position and do not provide good front support to the tendon. Such wraps tend to move during use of the leg. The wraps, being purely elastic tension members, only contact the outer high points of the leg and provide no pressure on tissue in indented areas. If the wrap becomes loose or unravels, it can cause injury to the horse and can even cause the horse to trip and fall, subjecting both horse and rider to serious injury.

U.S. Pat. No. 5,115,627, issued on May 26, 1992, to D. Scott describes a protective support wrap for a horse. In this patent, a wrap is provided for the horse's lower leg which includes a panel configuration adapted to wrap once around the leg from near the pastern to above the fetlock and to conform to the shape of the leg. The panel is comprised of an inner layer of shock dissipating material and an outer layer of elastic shock absorbing material. The inner layer is attached to the outer layer such that, upon wrapping, bulges created in the inner layer conform to the indentation between the tendon and bone so as to support them in their natural positions. An elastic support strap passes under the fetlock for additional support and is secured under the fetlock so that it will not move during the movement of the leg. This elastic support strap is an elastic strap which is sewn to an edge of the panel. The protective support wrap of this patent utilizes three VELCRO (TM) bindings extending at evenly spaced locations above the fetlock. Each of these VELCRO (TM) bindings have an edge which is stitched to the panel. Each of the VELCRO (TM) bindings is of approximately equal size and length.

In U.S. Pat. No. 5,115,627, the inner layer of material is sewn to the outer layer of material. This is carried out so that the inner layer will deform relative to the outer layer so as to conform to the leg indentations. Additionally, the vertical edges of the inner layer on the protective support wrap of U.S. Pat. No. 5,115,627 are indented from the vertical edges of the outer layer.

There are various problems with the protective support wrap of U.S. Pat. No. 5,115,627. First, and foremost, use of the elastic strap for the fetlock cradle sling strap pulls up on the fetlock joint at only one side. The fetlock cradle sling is attached or sewn to the shell of the boot at horizontal or a 90° angle so as to cause one-sided torque on the ankles and tendons of the horse. The application of this one-sided torque causes the ankle cartilage to quickly wear out. As such, there is a need to provide a protective support wrap which avoids this one-sided torque effect.

U.S. Pat. No. 5,115,627 has unsewn edges. Unfortunately, the edges of this protective support wrap have a tendency to "open" during the movement of the horse. This can allow dirt, and other infectious material, to enter in the area between the inner layer of the protective support wrap and the outer surface of the horse's leg. The use of several VELCRO (TM) straps in U.S. Pat. No. 5,115,627 applies pressure on the lower leg in increments. The multiple bindings also make removal and application of the wrap much more difficult. Multiple bindings create uneven tendon pressure and can cause injury to the tendons. In order to properly protect the lower leg of the horse, it is desirable to apply pressure evenly across the outer surface of the leg.

In U.S. Pat. No. 5,115,627, the inner layer is secured to the outer layer solely by stitching. As a result of this process, the inner layer has had a tendency to fold and wrinkle against the skin of the horse. This can cause abrasion and injury following continual use. If enough of the inner layer folds up against a tendon of the horse's leg, permanent damage to the leg and to the tendon can occur. Since the wrap of U.S. Pat. No. 5,115,627 stitches the vertical edges of the inner layer to the outer layer inwardly of the outer edges of the outer layer, there is a tendency for the inner layer to "roll" under the outer layer. Once again, this can cause abrasion or injury to the leg of the horse.

A problem common to virtually all support wraps for the lower leg of a horse is that the support wraps tended to flatten the tendon against the canon bone. When the support wrap was wrapped around the lower leg of a horse, the tendons would be pushed against the bone from only the back side. As such, the support wrap failed to support the tendon from all sides. As such, such support wraps failed to attain maximum performance in the support of the tendon.

It is an object of the present invention to provide a protective support wrap that provides three-sided support to the flexor tendons in the lower leg of the horse.

It is still another object of the present invention to provide a protective support wrap which assures constant contact of the wrap's shock absorbing material to the tendons and ligaments throughout the stride of the horse.

It is another object of the present invention to provide a support wrap which ensures maximum energy absorption and support and minimizes soft tissue vibration in the flexor tendons and suspensory ligaments.

It is still another object of the present invention to provide a protective support wrap for the lower leg of a horse which serves to prevent any shifting of the wrap horizontally in motion, to reduce heat and friction from vertical shifting in high performance events, and to conform gently to the shape and death of the tendons grooves of the horse leg.

It is still another object of the present invention to provide a protective support wrap that resists the intrusion of dirt and other infectious material.

It is a further object of the present invention to provide a protective support wrap that can be easily applied and removed.

It is still another object of the present invention to provide a protective support wrap that avoids interior wrinkling, folding, and "roll under".

It is still a further object of the present invention to provide a deeper pocket that accommodates the ankle of the horse.

It is another object of the present invention to provide a protective support wrap to alleviate wrinkles caused by the fetlock cradle sling and to reduce injuries to the back of the fetlock.

It is still another object of the present invention to provide a protective support wrap that is easy to use, easy to manufacture, and relatively inexpensive.

These and other objects and advantages of the present invention will become apparent from a reading of the attached specification and appended claims.

SUMMARY OF THE INVENTION

The present invention is a protective support wrap for a lower leg of a horse comprising a panel, a tendon support means affixed to the panel and having a surface protruding outwardly of the inner surface of the panel so as to press against the tendon of the lower leg of the horse, and a fastener means affixed to the panel and extending outwardly therefrom for affixing to the outer surface of the panel when the panel is wrapped around the lower leg of the horse.

In the present invention, the tendon support means includes a first tendon support roll affixed to the panel and extending transverse to the length dimension of the panel and a second tendon support roll affixed to the panel in spaced parallel relationship to the first tendon support roll. Each of the first and second tendon support rolls has an upper end and a lower end. The upper end is tapered so as to thicken in a direction toward the lower end. The lower end is tapered so as to thicken in a direction toward the upper end. Each of the upper and lower ends has curved edges.

In the preferred embodiment of the present invention, the panel has an inner layer and an outer layer. The first and second tendon support rolls are bonded to the outer layer. The inner layer extends over the protruding surface of the tendon support rolls. Specifically, each of the first and second tendon support rolls includes a leather strip bonded to the outer layer of the panel and a neoprene strip affixed to a surface of the leather strip opposite the outer layer of the panel. The neoprene strip is coextensive with the leather strip. The inner layer of the panel is bonded to a surface of the neoprene strip opposite the leather strip. A stitching extends around a perimeter of each of the first and second tendon support rolls.

DETAILED DESCRIPTION OF THE INVENTION

Figure 1:
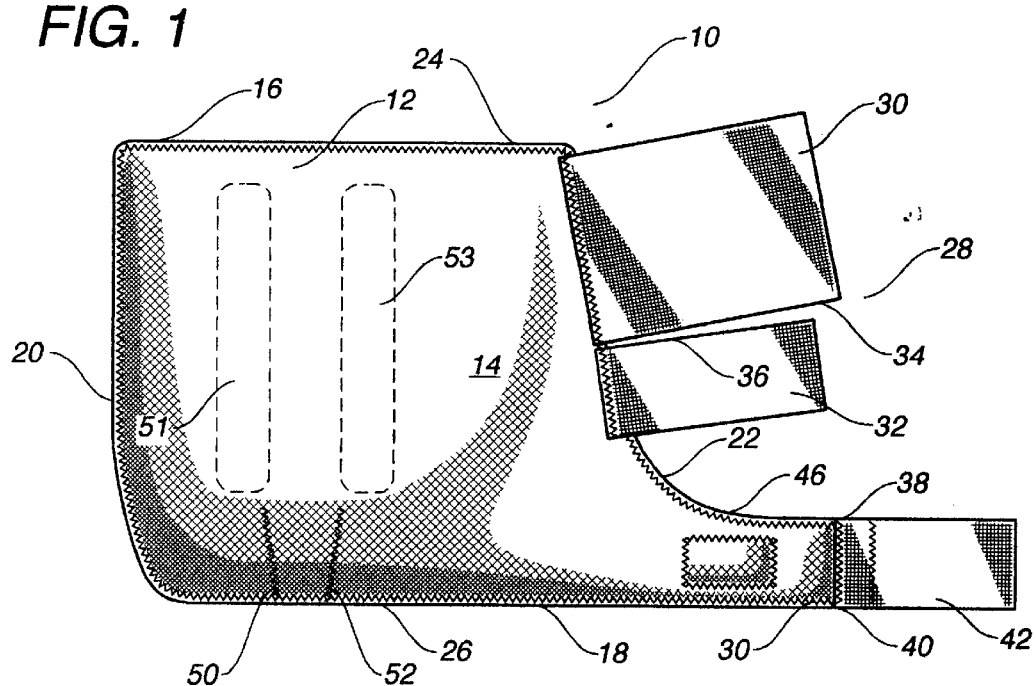
FIG. 1 is an outer side elevational view of the protective support wrap of the present invention.
Figure 2:
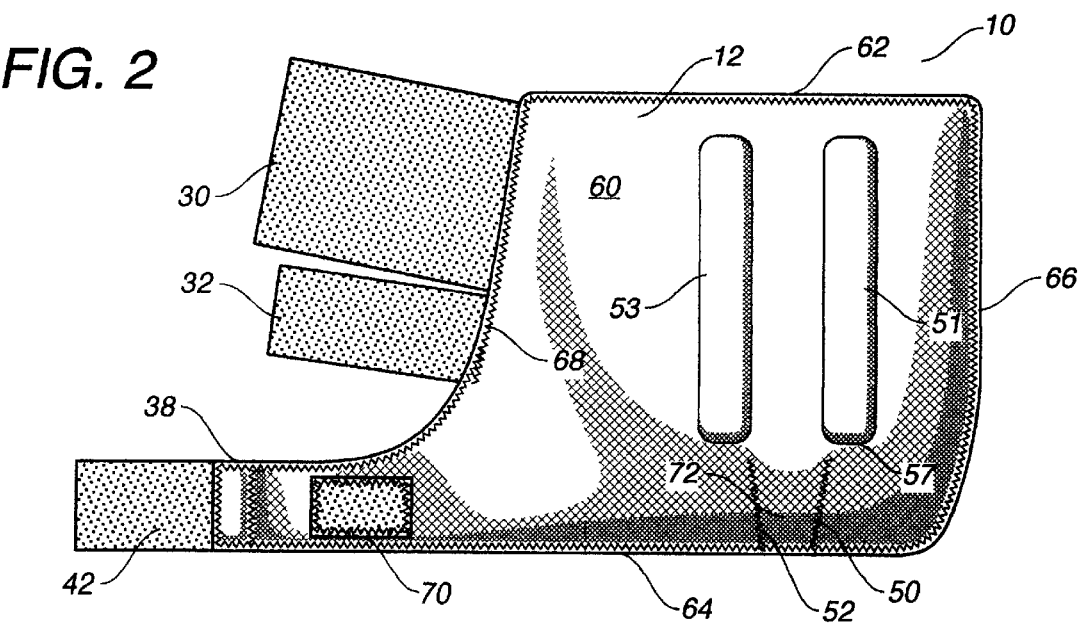
FIG. 2 is an inner side elevational view of to protective support wrap of the present invention.

Referring to FIG. 1, there is shown at 10 the protective support wrap for the lower leg of a horse. Specifically, in FIG. 1, the protective support wrap 10 is shown in its exterior view. The protective support wrap 10 comprises a panel 12 having a roughly rectangular configuration. It can be seen that the panel 12 has an outer layer 14. The inner layer of the panel 12 is illustrated in FIG. 2. This outer layer 14 is made of a closed cell neoprene material. The outer layer includes a top edge 16, a bottom edge 18, a first side edge 20 and a second side edge 22. The top edge 16 and the bottom edge 18 are in parallel relationship. The side edges 20 and 22 are of a generally vertical configuration.

In FIG. 1, it can be seen that the top edge 16 of the outer layer 14 is secured to the inner layer (shown in FIG. 2) at the top edge 16 by cross-stitching 24. Similarly, the bottom edge of the outer layer 14 is secured to the inner layer by similar cross-stitching 26. The use of the cross-stitchings 24 and 26 creates a "pucker" effect along these edges. As such, when the wrap 10 is extended around the lower leg of a horse, the top edge 16 and the bottom edge 18 will tend to draw in upon themselves so as to "seal" the top and bottom of the wrap 10. This "pucker" effect serves to prevent dirt, and other infectious material, from entering the area between the wrap 10 and the skin of the horse. The use of the term "cross-stitch", as used herein, does not include the overlock stitching.

In FIG. 1, it can be seen that a first fastener arrangement 28 is affixed to the panel 12 and extends outwardly from the second side edge 22. This fastener arrangement 28 serves to affix to the surface of the outer layer 14 when the panel 12 is wrapped around the lower leg of the horse. The fastener arrangement 28 includes a first strap 30 of hook-and-loop material and a second strap 32 of hook-and-loop material. The first strap 30 extends outwardly from the edge 22 of the panel 12 generally adjacent to the top edge 16. The second strap extends outwardly from the edge 22 below the first strap 30. The first strap 30 has an area approximately twice the area of the second strap 32. The lower edge 34 of the first strap 30 is in near proximity to the upper edge 36 of the second strap 32.

The configuration of the fastener arrangement 28 is a significant improvement over the prior art. The use of the large first strap 30, in combination with the smaller second strap 32, provides even pressure onto the horse's leg. There are no spaces between the straps that create an incremental pressure effect. It has been found that the application of the even pressure greatly facilitates the support of the horse's leg in a proper manner. The close proximity of the lower edge 34 and the upper edge 32 assures that the straps will be almost continuous when wrapped across the leg of the horse. The use of one large strap and one small strap greatly facilitates application and removal of the wrap 10.

A fetlock cradle sling strap 38 has a first portion 30 that is integrally connected to the panel 12 and extends outwardly from the edge 22 of the panel. A fastener 42 is affixed to an end 44 of the first portion 40 opposite the edge 22. Specifically, the first portion 40 of the fetlock cradle sling strap 38 is integral with the outer layer 14 of the panel 12. Importantly, the first portion 40 and the fastener 42 are made of an inelastic material. The first portion 40 has an upper edge 46 that extends, in a curved fashion, from the edge 22 of the outer layer 14 at an approximately forty-five degree angle. The fastener 42 is a strip of hook-and-loop material which allows the fetlock cradle sling strap 38 to be properly secured to the outer surface of the outer layer 14. In use, the fetlock cradle sling strap 38 is a significant improvement over the prior art. The fetlock cradle sling strap 38 is actually an integral part of the neoprene outer layer 14. This creates a wider fetlock support cradle. As a result, more reliable support and protection is provided while enhancing the appearance and adding durability to the wrap 10. The forty-five degree angle creates a sling strap effect upon the fetlock joint of the horse. Since the first portion 40 is elastic and the fastener 42 is of a generally inelastic material, the one-sided torque effect is avoided. When the fastener 42 is pulled upwardly at a forty-five degree angle, even pressures are applied to the fetlock joint. As a result, unnecessary wearing of the cartilage is avoided.

It can be seen that a pair of pleats 50 and 52 is formed in the panel 12 generally adjacent to the bottom edge 18. The area between the pleats 50 and 52 is an indented pocket for accommodating the ankle of the horse. As a result, of this pleat, the wrap 10 is more form fitting. The use of the pleats 50 and 52 avoids the problem of wrinkling at the base of the ankle and also provides a deeper pocket than that of the prior art.

As can be seen in FIG. 1, stitching is provided on the outer layer 14 for the first tendon support roll 51 and the second tendon support roll 53. The first tendon support roll 51 and the second tendon support roll 53 extend transverse to the length dimension of the support wrap 10. The second tendon support roll 53 is arranged in spaced parallel relationship to that of the first tendon support roll 51. As can be seen, the tendon support rolls 51 and 53 extend directly above the pocket formed by the pleats 50 and 52. The tendon support rolls 51 and 53 have a vertical length which is less than the width of the support wrap 10. Ideally, in accordance with the teachings of the present invention, each of the first tendon support roll 51 and the second tendon support roll 53 has a width of ¾ of an inch.

FIG. 2 shows the inner layer 60 of the panel 12. The inner layer 60 is of an ultra-shock material, such as closed cell foam. Importantly, the inner layer 60 is secured to the outer layer 14 by the application of adhesive over the entire area of the inner layer 60. The adhesive will extend across the entire area of the inner layer 60 between the inner layer 60 and the outer layer 14. The use of the adhesive strongly secures the inner layer 60 to the outer layer 14. This avoids the problems associated with the folding and wrinkling of the inner layer 60 against the skin of the horse. The use of the adhesive bonding of the inner layer 60 to the outer layer 14 avoids abrasion, injuries, and damage to the tendons of the horse's leg.

It can be seen in FIG. 2 that the upper edge 62 is secured by cross-stitching 24 to the upper edge 16 of the outer layer 14. Similarly, the lower edge 64 of the inner layer 60 is secured by cross-stitching 26 to the bottom edge 18 of the outer layer 14. There is no gap between the edges of the inner layer 60 and the edges of the outer layer 14. Similarly, the side edge 66 of the inner layer 60 is stitched directly to the side edge 20 of the outer layer 14. There is no gap or indentation between these edges. This arrangement avoids any "roll under" effect between the edges of the layers. Similarly, the other side edge 68 of the inner layer 60 is stitched directly to the second side edge 22 of the outer layer 14.

In FIG. 2, it can be seen that the first strap 30 and the second strap 32 extend outwardly from the side edge 68. The fetlock cradle sling strap 38 extends outwardly from the side edge 68. The fasteners 30, 32, and 42 are shown as being of a hook-and-loop material. An additional square fastener 70 is provided along the fetlock cradle sling strap 38 to further enhance the ability to secure the wrap 10 around the leg of the horse.

The pleats 50 and 52 serve to create an indentation 72 adjacent the bottom edge 26 of the panel 12.

Importantly, in FIG. 2, the tendon support rolls 51 and 53 are illustrated with particularity. As can be seen, each of the tendon support rolls 51 and 53 has an upper end 55 and a lower end 57. The upper end 55 is tapered so as to thicken in a direction toward the lower end 57. Similarly, the lower end 57 is tapered so as to thicken in a direction toward the upper end 55. Each of the upper end 55 and the lower end 57 has curved edges. As such, the tendon support rolls 51 and 53 have been created so as to avoid any sharp edges that could occur when the support wrap 10 is wrapped around the lower leg of the horse.

It can be seen that the tendon support rolls 51 and 53 protrude outwardly of the inner surface 60 of the panel 12. As such, the tendon support rolls 51 and 53 provide a surface which can press against the flexor tendon of the horse's leg.

Figure 3:
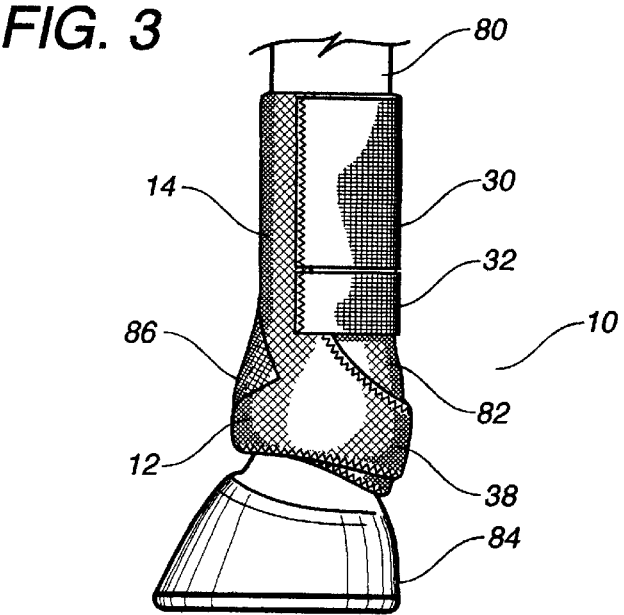
FIG. 3 is a side elevational view showing the protective support wrap of the present invention as applied to the lower leg of a horse.

FIG. 3 shows the wrap 10 as applied around the leg 80 of a horse. In particular, it can be seen that the first strap 30 and the second strap 32 extend around the leg 80 of the horse. The ends of the straps 30 and 32 are received and are affixed to the outer surface of the outer layer 14 of panel 12. Importantly, it can be seen that the first strap 30 and the second strap 32 will reside in close proximity. There is an insignificant gap between the lower edge of the first strap 30 and the top edge of the second strap 32. As a result, the straps 30 and 32 provide even and uniform pressure against the leg 80 of the horse.

In FIG. 3, the fetlock cradle sling strap 38 extends downwardly from the side edge 22 so as to extend below the fetlock 82 and above the hoof 84 of the horse's leg 80. It can be seen that the opposite end 86 of the fetlock cradle sling strap 38 is affixed to the outer surface of the outer layer 14. The end 86 is drawn upwardly at an approximately forty-five degree angle. As such, the "sling" effect of the fetlock cradle sling strap 38 is provided.

Figure 4:
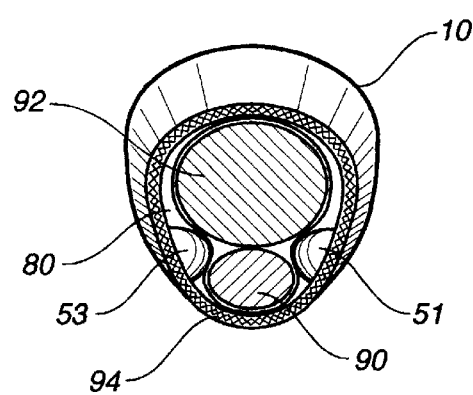
FIG. 4 is a cross-sectional view of the protective support wrap as applied to the lower leg of the horse.

FIG. 4 shows the manner in which the support wrap 10 extends around the leg 80 of the horse so as to retain the tendon 90 in a proper position relative to the canon bone 92 of the horse's leg 80. As can be seen in FIG. 4, the tendon support rolls 51 and 53 rest against the sides of the flexor tendon 90. Additionally, a surface 94 of the support wrap 10 rests against the outer surface of the tendon 90. As a result, the support wrap 10 of the present invention, through the use of the tendon support rolls 51 and 53, provides even three-sided pressure against the tendon 90. The tendon rolls 51 and 53 are designed to ensure constant contact of the support wrap's shock-absorbing material against the tendons and ligaments of the horse's leg 80 throughout the stride of the performance horse. This will ensure maximum energy absorption and support and minimize soft tissue vibration in the flexor tendons and suspensory ligament, including the attachment to the sesmoid bones. As a result, the support wrap 10 of the present invention is an improved protection system that reduces trauma to the flexor tendons and the suspensory apparatus (suspensory ligament, sesmoid bones and the sesmoidian ligaments). The stabilization supports found in the support wrap of the present invention prevent any shifting of the support wrap horizontally in motion and reduces heat and friction from vertical shifting in high performance events. The support wrap 10 gently conforms to the shape and depth of each horse's tendon grooves for non-invasive external support.

Figure 5:
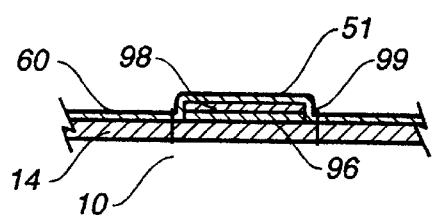
FIG. 5 is a cross-sectional view showing the layered arrangement forming the tendon support roll.

FIG. 5 illustrates the manner in which the tendon support roll 51 is affixed to the support wrap 10. In FIG. 5, the support wrap is shown as having an outer layer 14 and an inner layer 60. The support rolls 51 are bonded to the outer layer 14. The inner layer 60 extends over the protruding surface of the support roll 51. The support roll 51 is made up of a leather strip 96 which is bonded to the outer layer 14. A neoprene strip 98 is affixed to a surface of the leather strip 96 opposite the outer layer 14. The neoprene strip 98 is co-extensive with the leather strip 96. The inner layer 60 is bonded to a surface of the neoprene strip 98 opposite the leather strip 96. Specifically, a stitching 99 extends around a perimeter of each of the first and second tendon support rolls and extends through the inner layer 60 and the outer layer 14 of the panel 12. Both the leather strip 96 and the neoprene strip 98 have a thickness of approximately ⅛ of an inch.

In the present application, the description of the panel 12 describes a panel as having an inner layer and an outer layer. It is within the scope of the present invention that the panel 12 can be made of a single layer of material. The inner and outer layer configuration of the panel 12 is the preferred embodiment of the present invention. However, the present invention should not be limited to such two-layer configurations of panels.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A protective support wrap for a lower leg of a horse comprising:

a panel having an inner surface and an outer surface, said panel having a length dimension suitable for wrapping around the lower leg;

a tendon support means affixed to said panel and having a surface protruding outwardly of said inner surface of said panel, said tendon support means for pressing against a tendon of the lower leg, said tendon support means comprising:

a first tendon support roll affixed to said panel and extending transversely to said length dimension; and a second tendon support roll affixed to said panel in spaced parallel relationship to said first tendon support roll, said panel having an inner layer and an outer layer, said first and second tendon support rolls being bonded to said outer layer, said inner layer extending over the protruding surface of said tendon support rolls; and a first fastener means affixed to said panel and extending outwardly therefrom, said first fastener means for affixing to said outer surface of said panel when said panel is wrapped around the lower leg.

2. The support wrap of claim 1, each of said first and second tendon support rolls having an upper end and a lower end, said upper end being tapered so as to thicken in a direction toward said lower end, said lower-end being tapered so as to thicken in a direction toward said upper end.

3. The support wrap of claim 2, each of said upper and lower ends having curved edges.

4. The support wrap of claim 1, each of said first and second tendon support rolls comprising:

a leather strip bonded to said outer layer; and a neoprene strip affixed to a surface of said leather strip opposite said outer layer, said neoprene strip being coextensive with said leather strip, said inner layer being bonded to a surface of said neoprene strip opposite said leather strip.

5. The support wrap of claim 4, each of said first and second tendon support rolls further comprising:

a stitching extending around a perimeter of each of said first and second tendon support rolls, said stitching extending through said inner and outer layers of said panel.

6. The support wrap of claim 4, said leather strip having a thickness of ⅛ inch, said neoprene strip having a thickness of ⅛ inch.

7. The support wrap of claim 1, each of said first and second tendon support rolls having a width of ¾ inch, said first and second tendon support rolls extending for less than a width dimension of said panel.

8. The support wrap of claim 1, further comprising:

a fetlock cradle sling strap having a first portion integrally connected to said panel and extending outwardly from an edge of said panel, said fetlock cradle sling strap having a fastener affixed to an end of said first portion opposite said edge.

9. The support wrap of claim 8, said first portion and said fastener of said fetlock cradle sling strap being of a generally inelastic material.

10. The support wrap of claim 1, said first fastener means comprising:

a first strap of hook-and-loop material extending outwardly from an edge of said panel generally adjacent an upper edge of said panel; and a second strap of hook-and-loop material extending outwardly from said edge of said panel below said first strap, said first strap having an area approximately twice the area of said second strap.

11. The support wrap of claim 1, said inner layer being adhesively fastened in surface-to-surface contact to said outer layer across an entire surface of said inner layer.

12. The support wrap of claim 1, said panel having a pleat formed adjacent a bottom edge of said panel, said pleat defining an indented pocket in said panel.

13. The support wrap of claim 12, said tendon support means positioned directly above said indented pocket.

14. A protective support wrap for a lower lea of a horse comprising:

a panel having an inner surface and an outer surface, said panel having a length dimension suitable for wrapping around the lower leg;

a tendon support means affixed to said panel and having a surface protruding outwardly of said inner surface of said panel, said tendon support means for pressing against a tendon of the lower leg;

a first fastener means affixed to said panel and extending outwardly therefrom, said first fastener means for affixing to said outer surface of said panel when said panel is wrapped around the lower leg; and a fetlock cradle sling strap having a first portion connected to said panel and extending outwardly from an edge of said panel, said fetlock cradle sling strap having a fastener affixed to an end of said first portion opposite said edge, said first portion and said fastener of said fetlock cradle sling strap being of a generally inelastic material, said first portion of said fetlock cradle sling strap having an upper edge extending outwardly from said edge of said panel at an approximately forty-five degree angle.

15. A protective support wrap for a lower leg of a horse comprising:

a panel having an inner surface and an outer surface, said panel having a length dimension suitable for wrapping around the lower leg;

a first tendon support roll affixed to said panel and extending transversely to said length dimension;

a second tendon support roll affixed to said panel in spaced parallel relationship to said first tendon support roll, each of said first and second tendon support rolls protruding outwardly of said inner surface of said panel, said panel having a pleat formed adjacent a bottom edge of said panel, said pleat defining an indented pocket in said panel, said first and second tendon support rolls positioned directly above said indented pocket; and a fastener means affixed to said panel, said fastener means for retaining said panel in a wrapped condition around the lower leg.

16. The support wrap of claim 15, said panel having an inner layer and an outer layer, said first and second tendon support rolls being bonded to said outer layer, said inner layer extending over the protruding surface of said first and second tendon support rolls.

17. The support wrap of claim 15, further comprising:

a fetlock cradle sling strap extending outwardly from an edge of said panel, said fetlock cradle sling strap having a fastener affixed thereto.

* * * * *